United States Patent [19]

Martin

[11] 3,711,526
[45] Jan. 16, 1973

[54] VAPOR PHASE PROCESS FOR PREPARING AROMATIC ISOTHIOCYANATES

[75] Inventor: Richard H. Martin, Brevard, N.C. 28712

[73] Assignee: Olin Corp.

[22] Filed: June 30, 1970

[21] Appl. No.: 51,339

[52] U.S. Cl. .................260/454, 71/104, 424/302
[51] Int. Cl. ..............................................C07c 161/04
[58] Field of Search........................................260/454

[56] References Cited

UNITED STATES PATENTS

| | | | |
|---|---|---|---|
| 3,530,161 | 9/1970 | Hull | 260/454 |
| 3,535,364 | 10/1970 | Scott et al. | 260/454 |
| 3,535,362 | 10/1970 | Ottmann et al. | 260/454 |
| 3,322,810 | 5/1967 | Olin | 260/454 |
| 3,149,141 | 9/1964 | Venerable et al. | 260/454 |

Primary Examiner—Lewis Gotts
Assistant Examiner—G. Hollrah
Attorney—Eugene Zagarella, Jr., Gordon D. Byrkit, Donald F. Clements, F. A. Iskander and Thomas P. O'Day

[57] ABSTRACT

A continuous vapor phase process for preparing aromatic isothiocyanates comprising reacting vaporized aromatic nitro compound with a gaseous sulfur-containing carbon compound in the presence of an alkali metal hydrosulfide.

10 Claims, No Drawings

VAPOR PHASE PROCESS FOR PREPARING AROMATIC ISOTHIOCYANATES

This invention relates to a continuous process for preparing aromatic isothiocyanates from the corresponding aromatic nitro compounds in a vapor phase reaction.

Esters of isothiocyanic acid have been previously prepared. They are useful agricultural chemicals since they have exhibited valuable utility as fungicides and herbicides. Many of these esters are useful nematocides and insecticides particularly as moth-proofing agents. Isothiocyanates have also been extensively employed as intermediates in the preparation of pesticidal and pharmaceutical compounds. For instance, they have been reacted with stoichiometric amounts of chlorine to provide N-aryl- and N-alkyl-S-chloroisothiocarbamoyl chlorides, for example, as disclosed in *Journal of Organic chemistry*, 31, 838 (1966); and these derivatives are useful as herbicides and nematocides. Isothiocyanates also react with a molar excess of chlorine to provide the corresponding isocyanide dichlorides which are known to be useful pesticides.

A variety of synthetic methods have been previously utilized to obtain the aforementioned esters. For example, they may be generally prepared by the reaction of primary amines with thiophosgene, but this is not a practical procedure since thiophosgene is not readily available. Some of the isothiocyanates have been prepared by the reaction of isocyanate esters with phosphorus pentasulfide, but this is not a general reaction and cannot be utilized in the preparation of all isothiocyanates. The esters have also been prepared by an involved synthetic route comprising reacting primary amines with carbon disulfide in the presence of selected bases to provide salts of dithiocarbamic acids which can then be further reacted to the desired isothiocyanates, but this is a complicated and costly procedure.

Another method for preparing aromatic isothiocyanates is disclosed in copending application Ser. No. 771,603 of Peter H. Scott and Haywood Hooks, Jr., filed Oct. 29, 1968 now U.S. Pat. No. 3,535,364, wherein reaction of aromatic nitrogen-containing compounds with carbon disulfide and/or carbon sulfide in the presence of potassium hydrosulfide in a liquid system resulted in the formation of aromatic isothiocyanates. While this method obviates many of the disadvantages mentioned in the previous methods, it still requires the use of increased pressure conditions.

It is an object of this invention to provide a simple continuous and economic process for preparing aromatic isothiocyanates from aromatic nitro compounds.

It is a further object of this invention to provide an improved process for preparing isothiocyanates from the corresponding aromatic nitro compounds in a vapor phase reaction.

These and other objects of this invention will be apparent from the following detailed description.

It has now been discovered that the above-mentioned objects are accomplished in a continuous process wherein a vaporized aromatic nitro compound is reacted with gaseous carbonyl sulfide and/or gaseous carbon disulfide in the presence of an alkali metal hydrosulfide catalyst at ambient or an elevated temperature, and a gaseous stream containing the aromatic isothiocyanate is removed from the reaction zone. This method is illustrated by the following equation wherein, for instance, vaporized nitrobenzene is reacted with gaseous carbonyl sulfide in the presence of potassium hydrosulfide to form phenyl isothiocyanate:

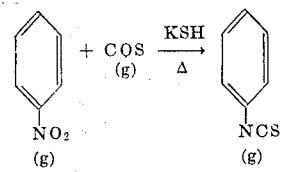

Some of the advantages resulting from the use of the novel vapor phase technique of this invention for preparing aromatic isothiocyanates include the following:

1. Solvents are unnecessary
2. Low catalyst loss
3. Low pressure equipment may be employed
4. Undesirable side reactions are minimized
5. Catalyst separation is instantaneous
6. Recovery operation is simplified In carrying out the method of this invention any aromatic nitro compound capable of being converted into an aromatic isothiocyanate may be employed as a reactant. As used herein, the term "aromatic nitro compound" represents those organic compounds having at least one nitro group attached directly to an aromatic hydrocarbon nucleus such as a benzene, naphthalene, anthracene, phenanthrene and the like. The aromatic hydrocarbon nucleus may also contain other ring substituents in addition to the nitro groups. Thus the term "aromatic nitro compound" as used herein also represents aromatic hydrocarbons having alkyl, aryl, aralkyl, alkoxy, aryloxy, alkylmercapto, arylmercapto, halogen, cyano, isocyanato or isothiocyanato substituents on the aromatic hydrocarbon moiety in addition to the one or more nitro groups. In general, these additional ring substituents do not inhibit completely the reaction of carbonyl sulfide or carbon disulfide with the nitro groups under the conditions of the process disclosed herein. Carbon disulfide or carbonyl sulfide may also react with some of these additional ring substituents concurrently with the reaction of the nitro groups, and some of these substituents may impede or retard the desired reaction of $CS_2$ or COS with the nitro groups as, for instance, by introducing a steric hindrance factor; but invariably some formation of aromatic isothiocyanate occurs by the process albeit at a reduced rate or in lower yield.

Thus among the aromatic nitro compounds which may be used as reactants in the practice of this invention are the various nitrobenzenes, nitronapthalenes and nitroanthracenes. Also included as useful reactants are the various nitrobiphenyls, nitrotoluenes, nitroxylenes, nitromesitylenes, nitrodiphenyl alkanes, alkoxynitrobenzenes, nitrodiphenyl ethers, nitropolyphenyl ethers, alkylmercapto nitrobenzenes, nitrodiphenyl thioethers, nitrobenzonitriles, and aromatic nitrohalocarbons.

Illustrative of specific aromatic nitro compounds useful as reactants are: nitrobenzene, o-dinitrobenzene, m-dinitrobenzene, p-dinitrobenzene, 1,3,5-trinitrobenzene, 1-nitronaphthalene, 2- onaphthalene, o-nitrotoluene, m-nitrotoluene, p-otoluene, 2,4-dinitrotoluene, 2,6-dinitrotoluene, o-o-p-xylene, 2-methyl-1-nitronaphthalene, itromesitylene, o-nitrobiphenyl, m-nitro-biphenyl, itrobiphenyl, 4,4'-dinitrobiphenyl, 2,4-itrobiphenyl, bis(p-nitrophenyl)methane, o-oanisole, m-nitroanisole, p-nitro-anisole, 2,4-itroanisole, o-nitrophenetole, p-nitrophenetole, and -dinitrophenetole.
imilarly: o-nitrophenyl phenyl ether, m-nitrophenyl nyl ether, p-nitrophenyl phenyl ether, bis(2,4-itrophenyl)-ether, bis(p-nitrophenyl)ether, o-ophenyl phenyl thioether, m-nitrophenyl phenyl ether, p-nitrophenyl phenyl thioether, bis(p-ophenyl)thioether, o-nitrophenyl methyl thioether, (p-nitrophenoxy)ethane, 1-chloro-2-nitrobenzene, romo-2-nitrobenzene, 1-chloro-3-nitrobenzene, 1-mo-3-nitrobenzene, 1-chloro-4-nitrobenzene, 1-mo-4-nitrobenzene, 1-fluoro-4-nitrobenzene, 2-oro-6-nitrotoluene, 2-bromo-6-nitrotoluene, 2-ıro-6-nitrotoluene, 4-chloro-3-nitrotoluene, 1-oro-2,4-dinitrobenzene, 1-bromo-2,4-itrobenzene, 1-fluoro-2,4-dinitrobenzene, 1,4-di-oro-2-nitrobenzene, 1,4-difluoro-2-nitrobenzene, ,5-trichloro-2-nitrobenzene, 1,3,5-tribromo-2-obenzene, 1,2-dichloro-4-nitrobenzene, 1,2,4-hloro-5-nitrobenzene, o-nitrophenyl isocyanate, m-ophenyl isocyanate, p-nitrophenyl isocyanate, 1-oro-2,4-dimethoxy-5-nitrobenzene, 1,4-dimethoxy-itrobenzene, o-nitrobenzonitrile, m-obenzonitrile, p-nitrobenzonitrile, 3,3'-dimethoxy-'-dinitrobiphenyl, and 3,3'-di-methyl-4,4'-itrobiphenyl may be employed as starting reactants. somer and mixtures of the aforesaid aromatic nitro npounds and substituted aromatic nitro compounds y also be utilized in the practice of this invention as l as homologues and other related compounds. nerally, the starting nitro compound reactants con-ı between 6 and about 20 and preferably up to about carbon atoms.
Vhile the process is generally applicable to the con-sion of any of the aforementioned aromatic nitro npounds to aromatic isothiocyanates, included ong the preferred reactants to be utilized in this intion are the nitrobenzenes, both mono- and ynitro, including isomeric mixtures thereof; the al-nitrobenzenes, including the various nitrated lenes and the nitrated xylenes; the alkox-robenzenes; the nitrated mono-, di-, and hlorobenzenes and toluenes; nitrated biphenyl and ated diphenylmethane. Other preferred reactants ch can be particularly mentioned include the odiphenyl ethers, the bis-(nitrophenoxy) alkanes, the bis(nitrophenyl) sulfides.
ı addition to the above described aromatic nitro ıpounds, corresponding aromatic nitroso, aromatic and aromatic azoxy compounds may also be util-l as a reactant.
!arbonyl sulfide (COS), carbon disulfide ($CS_2$) and tures thereof may be used as a second reactant in ·ying out the method of this invention. For con-ience, the term "sulfur-containing carbon com-nd" will be used throughout the description and ms to include either carbon disulfide, carbonyl sul-or mixtures thereof in any ratio.

Any alkali metal hydrosulfide may be used as catalyst but potassium hydrosulfide is the particularly preferred embodiment. The function of the alkali metal hydrosulfide in the reaction is not clearly understood, but it appears to have some catalytic effect on the reaction. For this reason, the alkali metal hydrosulfide is referred to throughout the description and claims as a catalyst, even though it may also be a reactant or other agent during the reaction.

The catalyst may be self-supported or deposited on a support or carrier for dispersing the catalyst to increase its effective surface. Alumina, silica, silicon carbide, carbon, barium sulfate, calcium carbonate, asbestos, bentonite, diatomaceous earth, fuller's earth and analogous materials are useful as carriers for this purpose.

In carrying out the method of this invention, the amount of sulfur-containing carbon compound used is not particularly critical with the amount present being at least sufficient to provide reactant for the process. Generally the total amount of sulfur-containing carbon compound added during reaction is between about 1 and about 100 and preferably between about 2 and about 15 moles of sulfur-containing carbon compound per mole of nitro group in the aromatic nitro compound. Greater or lesser amounts may be employed if desired but optimum yields of aromatic isothiocyanates are obtained when excess molar amounts are employed, that is, more than an equimolar quantity in reaction with a mononitro compound, for instance. The highest requirements of sulfur-containing carbon compound are generally utilized in a process in which the gas is added continuously, but suitable recycle of the gas stream greatly reduces the overall consumption of the sulfur-containing carbon compound.

The proportion of alkali metal hydrosulfide utilized in the carrying out of the method of this invention is generally in the range of about 1:1000 to about 1:1 and preferably between about 1:100 and about 1:2 moles of alkali metal hydrosulfide per mole of nitro group in the aromatic nitro compound. However, greater or lesser proportions may be employed if desired.

The novel process of this invention can be carried out in any suitable apparatus adapted for vapor phase reactions. In one embodiment of this invention, means are provided for conveying the aromatic nitro compound to a vaporizer where the liquid reactant is heated to form a gas or vapor, and the resulting vapor is then fed into the bottom of a vertical tube reactor, preferably after passing the vapor through a heat exchanger or preheater. The sulfur-containing carbon compound is also preferably preheated to an elevated temperature prior to being fed into the reactor.

The vertical tube reactor is provided with suitable means for maintaining the temperature in the reactor within the desired range. The reaction temperature will vary depending generally upon the boiling point of the aromatic nitro compound and the resulting isothiocyanate product. The operating temperature is generally in the range between about ambient temperature (about 20°C.) and about 600°C., and preferably between about 100° and about 450°C.

The vertical reactor tube is partially or completely filled with the catalyst in a form which permits passage of the gaseous reaction mixture without causing an unnecessarily high pressure drop across the catalyst bed. The catalyst in the vertical reactor tube may be of the fixed bed type, the fluidized bed type, or any other convenient form. In one embodiment, the catalyst is supported on glass beads or silicon carbide beads, which may be continuously withdrawn and regenerated without the need for stopping the continuous process.

The gaseous aromatic nitro compound and the sulfur-containing carbon compound gas may be premixed, generally by premixing in any suitable mixing nozzle and fed into the vertical reactor tube for passage through the catalyst bed. If desired, the two gaseous streams may be mixed at the bottom of the reactor tube in a suitable nozzle, or may be fed individually into the reactor tube or the catalyst bed. Best results are generally obtained when the two gaseous streams are premixed prior to passing through the catalyst bed.

The reaction product in gaseous form is withdrawn from the top of the vertical reactor tube, or any other convenient point, passed through suitable traps and condensers, and the resulting liquid phase which contains the reaction product is collected. The gas phase from the condensers may contain a substantial portion of sulfur-containing carbon compound and aromatic nitro compound and if desired, this gas stream may be recycled to the vaporizer or may be further treated to recover unreacted aromatic nitro compound and sulfur-containing carbon compound for further reaction.

One advantage of the process of this invention is that it can be carried out at atmospheric pressure thus eliminating the need for highly expensive equipment that is necessary in liquid phase reactions of this type. If desired, somewhat higher or lower pressures may be employed.

The following example is presented to further illustrate the invention without any intention of being limited thereby.

EXAMPLE

A vertical reactor tube 36 inches long with an inside diameter of approximately 0.8 inch was charged to a depth of about 6 inches with pyrex glass beads to permit final preheating and the remainder was filled with a catalyst system made up of 9 percent by weight KSH supported on 4-8 mesh SiC (total weight 164 grams).

The catalyst bed was purged with preheated dry nitrogen at reaction temperature (~350°C.) for one hour prior to reaction to purge off any remaining water and absorbed gases (e.g. $O_2$).

Nitrobenzene was charged to a liquid vaporizer and maintained at 164°C. resulting in a nitrobenzene vapor pressure of approximately 200 torr. A preheated (165°C.) flow of carbonyl sulfide was passed through the vaporizer, entraining nitrobenzene vapors at the saturation vapor pressure of 200 torr and subsequently passed through a heat exchanger at 250°C. and then to an injection nozzle at the bottom of the reactor tube. The vaporizer to heat exchanger connecting tube and heat exchanger to injection nozzle connector tube were maintained at temperatures of 180° and 300°C. respectively.

A second carbonyl sulfide gas line leading directly to the heat exchanger and then to the injection nozzle at the bottom of the reactor tube was connected through suitable conduits and valves such that an admixture of the gases from the two lines could be fed into the reactor.

The injection nozzle was fabricated with 180° opposed dual inlets to permit mixing of the gases from the two lines described above.

The gases were run through the reactor for one hour with a total flow of 200 cc/min. (100 cc/min. through each inlet tube) made up of a 6:1 mole ratio of carbonyl sulfide to nitrobenzene.

During the course of the reaction, the average reactor temperature was 350°C. with the temperature being controlled by a proportional temperature controller and three individually adjustable zone heaters. Reaction temperature was monitored at the respective centers of the top, middle and bottom reactor zones by calibrated thermocouples, which were inserted in a 0.25 inch O.D. thermocouple well extending down the center of the reactor tube.

The reactor tube was provided with an outlet at the top, which was connected to suitable traps and condensers for collection of reaction product.

The reaction was run under atmospheric pressure and after the one hour reaction period, the two gas feed lines were shut off and dry nitrogen again passed through the reactor for an additional hour. This desorbed any unreacted nitrobenzene and products on the catalyst bed.

Infrared analysis of the trapped reactor effluent indicated isothiocyanate, and subsequent vapor phase chromatographic analysis indicated 2.0 percent phenyl isothiocyanate.

What is claimed is:

1. A continuous process for preparing aromatic isothiocyanates from the corresponding aromatic nitro compound which comprises:
   a. vaporizing a nitro substituted aromatic hydrocarbon containing from 6 to about 20 carbon atoms
   b. mixing the resulting vapor with a gaseous sulfur-containing carbon compound selected from the group consisting of:
      1. carbonyl sulfide
      2. carbon disulfide
      3. mixtures of carbonyl sulfide and carbon disulfide
      wherein the molar ratio of said gaseous sulfur-containing compound to each nitro group in said nitro-substituted aromatic hydrocarbon is between about 1:1 and about 100:1
   c. contacting the resulting mixture with potassium hydrosulfide in a reaction zone at a temperature of between about 20° and about 600°C.,
      wherein the molar ratio of said potassium hydrosulfide to each nitro group in said nitro-substituted aromatic hydrocarbon is between about 1:000 to about 1:1 and
   d. withdrawing the resulting reaction product containing the aromatic isothiocyanate from said reaction zone.

2. The process of claim 1 wherein the temperature in the reaction zone is from about 100° to about 450°C.

3. The process of claim 1 wherein said nitro-substituted aromatic hydrocarbon contains up to about 14 carbon atoms.

4. The process of claim 1 wherein the molar ratio of said sulfur-containing carbon compound to each nitro up in said nitro-substituted aromatic hydrocarbon is between about 2:1 and about 15:1.

. The process of claim 1 wherein the molar ratio of  potassium hydrosulfide to each nitro group in said o-substituted aromatic hydrocarbon is between about 1:100 and about 1:2.

. The process of claim 1 wherein said sulfur-conning carbon compound is selected from the group sisting of carbonyl sulfide and carbon disulfide.

. The process of claim 1 wherein said nitro-subuted aromatic hydrocarbon is nitrobenzene and said 'ur-containing carbon compound is carbonyl sulfide.

8. The process of claim 7 wherein the temperature in the reaction zone is from about 100° to about 450°C.

9. The process of claim 8 wherein the molar ratio of said sulfur-containing carbon compound to each nitro group in said nitro-substituted aromatic hydrocarbon is between about 2:1 and about 15:1.

10. The process of claim 9 wherein the molar ratio of said potassium hydrosulfide to each nitro group in said nitro-substituted aromatic hydrocarbon is between about 1:100 and about 1:2.

* * * * *